United States Patent [19]

Körner et al.

[11] Patent Number: 4,469,352
[45] Date of Patent: Sep. 4, 1984

[54] MOTOR VEHICLE WITH A VERTICALLY ADJUSTABLE SAFETY BELT GUIDE FITTING

[75] Inventors: Paul Körner; Heinz Rest, both of Cologne; Ralf Giese, Mechernich, all of Fed. Rep. of Germany

[73] Assignee: Ford Motor Company, Dearborn, Mich.

[21] Appl. No.: 377,881

[22] Filed: May 13, 1982

[30] Foreign Application Priority Data

May 21, 1981 [DE] Fed. Rep. of Germany ....... 3120182

[51] Int. Cl.³ ..................... B60R 21/10; A62B 35/02
[52] U.S. Cl. .................................. 280/808; 297/483
[58] Field of Search .................... 280/808, 807; 297/474–480, 483–486

[56] References Cited

U.S. PATENT DOCUMENTS

| | | | |
|---|---|---|---|
| 4,307,853 | 9/1981 | Higbee et al. | 280/808 |
| 4,337,907 | 7/1981 | Fox | 280/808 |
| 4,398,749 | 8/1983 | Hipp et al. | 280/801 |

FOREIGN PATENT DOCUMENTS

2303222  8/1974  Fed. Rep. of Germany .

*Primary Examiner*—Richard A. Bertsch
*Attorney, Agent, or Firm*—Daniel M. Stock; Clifford L. Sadler

[57] ABSTRACT

In a motor vehicle with a vertically adjustable safety belt guide fitting with a hollow component which is located on or in the B-pillar and has a toothed portion of the length of the desired range of adjustment and in which an engagement slide having corresponding teeth is guided and can be engaged in different positions with the toothed portion, the hollow component is designed as a sheet metal profile part (2) made approximately C-shaped in cross-section, in which a separate angular toothed strip (13) is fastened adjacent to its base (3) and the inwardly directed legs of which form guides (5) for a sliding piece (6), H-shaped in cross-section, which receives a fastening bolt (8) about which an eccentric bushing (9) is mounted pivotably. The eccentric bushing (9) has an eccentric disc (10) and a shank (11), the shank (11) possessing flattened portions (12). The eccentric disc (10) engages into a circular aperture (17) in an engagement disc (15) which lies in the plane of the teeth (14) of the toothed strip (13) and which has corresponding teeth (16). The shank (11) is connected so as to be partially rotatable and fixed against rotation via a sleeve (18), to a sheet metal part (20) which holds a guide shackle (21) consisting of round material and which forms the actual guide fitting (22) for the safety belt (23). The vertical position of the safety belt guide fitting (22) can be adjusted by means of specific pivoting upwards and to the rear.

2 Claims, 3 Drawing Figures

4,469,352

MOTOR VEHICLE WITH A VERTICALLY ADJUSTABLE SAFETY BELT GUIDE FITTING

BACKGROUND OF THE INVENTION

1. Field of Invention

The present invention relates generally to motor vehicle safety belts and more specifically to vertically adjustable guide fittings therefor.

2. Description of the Prior Art

A motor vehicle with a vertically adjustable safety belt guide fitting of this type is already known from German Offenlegungsschrift No. 2,303,222. In this known embodiment, the hollow component is made of solid material, and the engagement slide is provided with spring elements which are intended to insure that, following an adjusting movement carried out by pressing on the engagement slide, the engagement slide safety engages again into the hollow component provided with a toothing.

The known arrangement has the disadvantage that it is expensive and costly to produce and that its operating reliability depends essentially on the spring elements. If a spring element breaks or loses its initial spring effect, the necessary positive locking is no longer satisfactorily provided.

SUMMARY OF THE INVENTION

The object of the invention is to improve a motor vehicle with a vertically adjustable safety belt guide fitting of this type, in such a way that the arrangement is simpler and more favorable to produce and has a reliable operation independent of spring elements. A definite clear guide for the adjusting sliding movement is also to be provided.

Secure locking of the engagement slide is effected whenever the belt is attached and this object is achieved because the hollow component is a sheet metal profile part made approximately C-shaped in cross-section, in which a separate angular toothed strip is fastened adjacent to its base and it includes inwardly directed legs of which form guides for a sliding piece, H-shaped in cross-section, which receives a fastening bolt about which is pivotally mounted an eccentric bushing, the eccentric disc of which engages into a corresponding circular aperture in an engagement disc which is located in the plane of the teeth of the toothed strip, the shank of said eccentric bushing being arranged, so as to be rotatable and fixed against rotation to an extent limited via a flattened portion and via a sleeve received in a sector-shaped aperture in a sheet metal part which holds a guide shackle which forms the actual guide fitting for the safety belt.

BRIEF DESCRIPTION OF THE DRAWINGS

The invention is explained in more detail with reference to an exemplary embodiment shown in the drawings in which.

DESCRIPTION OF THE PREFERRED EMBODIMENT

Figure 1:
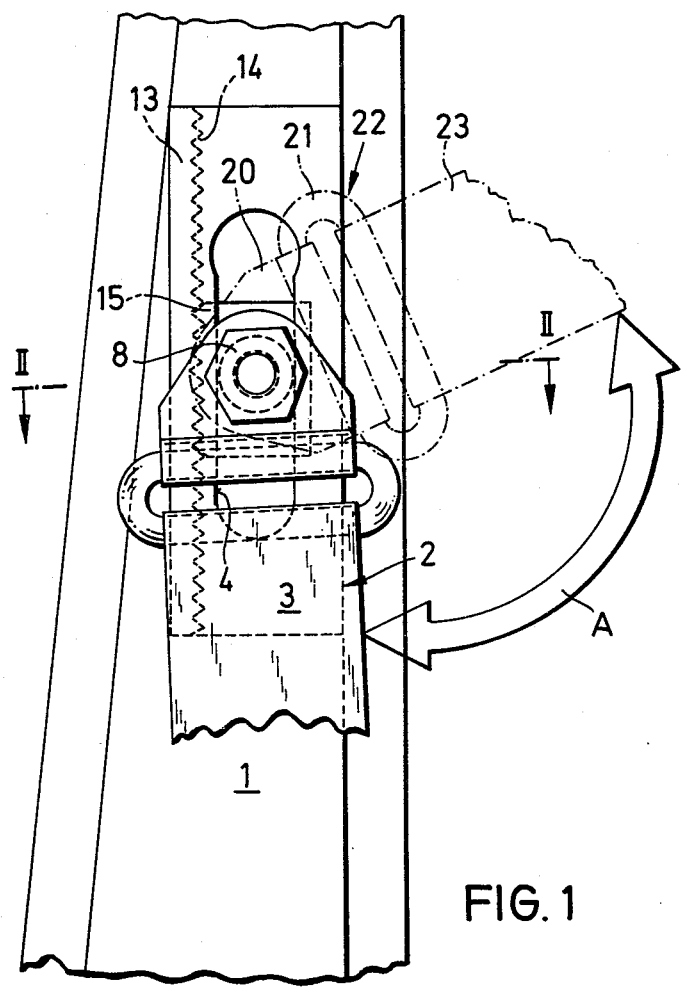
FIG. 1 shows a view of the vertically adjustable safety belt guide fitting located internally on the B-pillar of a motor vehicle body.
Figure 2:
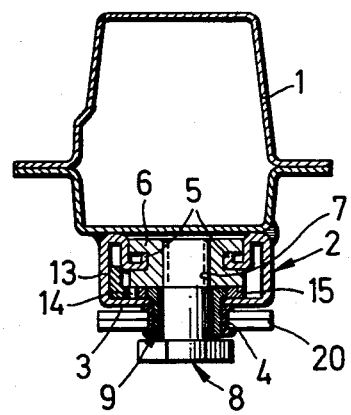
FIG. 2 shows a section along the line II-I in FIG. 1.
Figure 3:
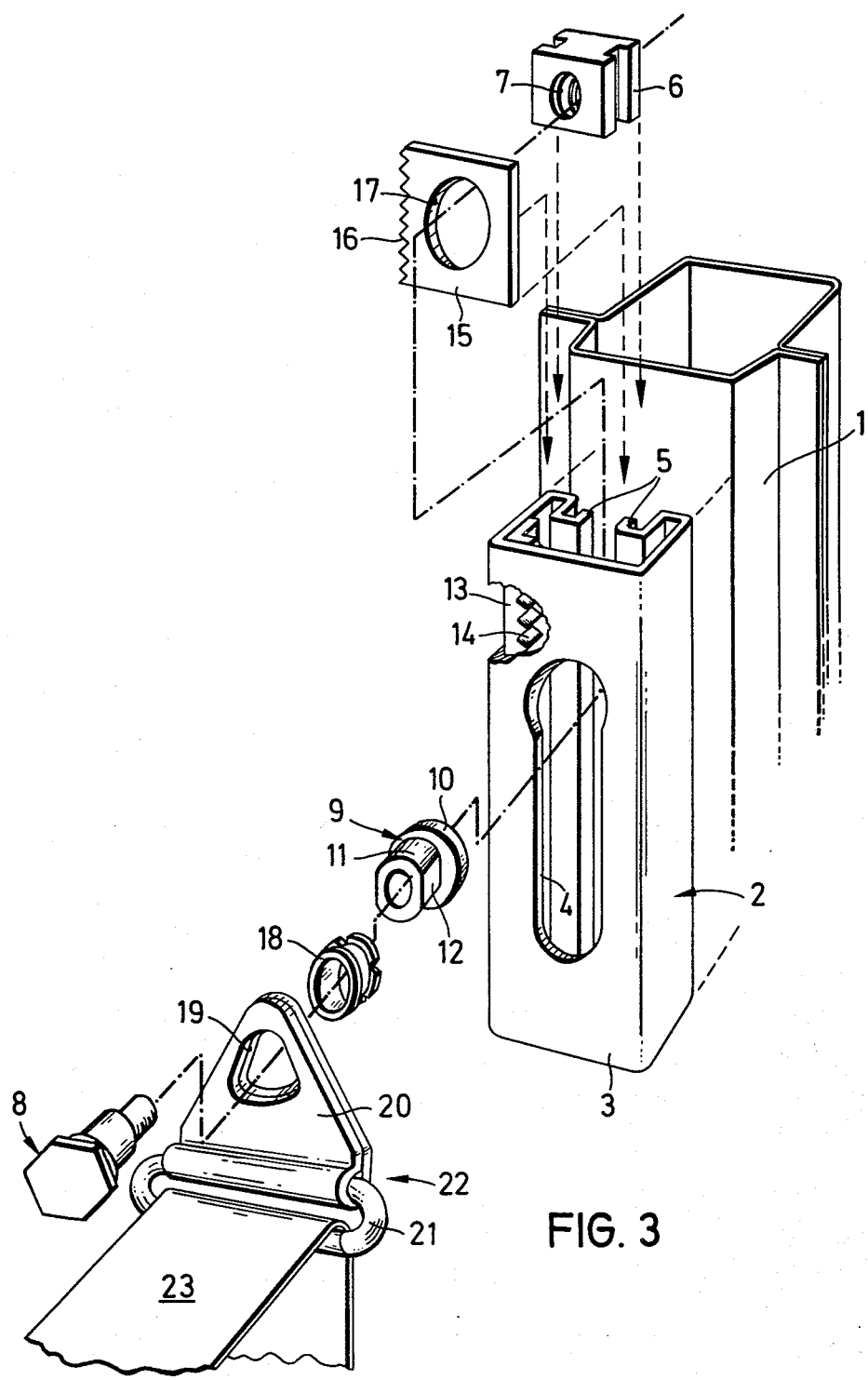
FIG. 3 shows an exploded representation of an arrangement of the vertically adjustable safety belt guide fitting of the invention.

In the figures, the B-pillar of a motor vehicle body is designated by 1.

A hollow component in the form of a sheet metal profile part 2 made approximately C-shaped in cross-section is fastened by welding to the B-pillar.

It should be pointed out that, although the sheet metal profile part 2 is shown in the drawings as projecting beyond the B-pillar 1, in mass production it can, of course, be embedded in an appropriately set-back recess in the B-pillar 1.

In its base 3 located on the outside, the sheet metal profile part 2 is provided with a keyhole-shaped aperture 4 and forms with its inwardly directed legs 5 guides for a sliding piece 6, H-shaped in cross-section.

The sliding piece 6 has a threaded bore 7 for receiving a fastening bolt 8. The fastening bolt 8 is designed as a flange bolt about which an eccentric bushing 9 is mounted pivotably. The eccentric bushing 9 has an eccentric disc 10 and a shank 11 with flattened portions 12.

Fastened on the inside and adjacent to the base 3 of the sheet metal profile part 2 is an angular toothed strip 13, the teeth 14 of which interact with a flat engagement disc 15 which lies parallel to the base 3 and which has corresponding teeth 16 and a circular aperture 17 for receiving the eccentric disc.

The eccentric bushing 9 is fastened, so as to be free of rattling and partially rotatable or fixed against rotation via a sleeve 18, in a sector-shaped aperture 19 in a sheet metal part 20 which forms, together with the guide shackle 21 consisting of round material, the actual guide fitting 22 for the safety belt 23.

In FIG. 1, the position of rest of the safety belt guide fitting 22 is drawn in solid lines, while the actuating position required for vertical adjustment is indicated in thick dot-and-dash lines.

To vary the vertical adjustment of the safety belt guide fitting 22, the safety belt 23 must therefore be grasped and pivoted somewhat more than 90° to the rear along the circular arc indicated by the arrow A. At the same time, the sheet metal part 20 carries the eccentric bushing 9 with it via the bushing 18 and thereby disengages the engagement disc 15 from the toothed strip 13 via the eccentric disc 10. The height of the safety belt guide fitting 22 can now be adjusted, the sliding piece 6 insuring a definite guidance of this sliding movement. As soon as the safety belt guide fitting 22 is pivoted downwards again, the eccentric bushing 9 is again carried with it and the engagement disc 15 engages with the toothed strip 13.

When the safety belt 23 is to be attached normally, the safety belt guide fitting 22 can be brought forward into the necessary inclination via the free-movement connection possible because of the sector-shaped aperture 19 in the sheet metal part 20.

We claim:

1. In a system for mounting a safety belt in a motor vehicle having a body including a B-pillar portion and having a vertically adjustable safety belt guide fitting formed as a hollow component and carried with the B-pillar, the guide fitting having a toothed portion extending through the length of the desired range of adjustment of the guide fitting, and having an engagement slide including teeth engageable with the teeth of the toothed portion at different vertical positions an improved guide fitting characterized in that
- A. the hollow component is formed as a sheet metal part of approximately C-shaped cross-section having inwardly extending guide legs formed with its side positions;
- B. a toothed strip is fixed to the base portion of the hollow component having its toothed surface extending in a direction normal to the guide legs;
- C. an H-shaped sliding piece is guidingly received on the guide legs within the hollow component and includes means for receiving a fastening bolt;
- D. an eccentric bushing is pivotably mounted about the fastening bolt, the eccentric bushing including a shank having flatted portions formed thereon and an eccentrically positioned disc;
- E. an engagement member is provided which includes a circular aperture for receiving the bushing disc and is located in the plane of the teeth of the toothed strip and includes corresponding teeth engageable with the teeth of the toothed strip in direct response to rotation of the bushing disc within the circular aperture;
- F. a sleeve member is formed to receive the bushing shank portion; and
- G. a sheet metal part carrying a guide shackle of the safety belt including means defining a sector-shaped aperture therethrough for receiving the sleeve whereby limited rotation of the eccentric bushing to move the engagement member teeth into and out of engagement with the teeth of the toothed strip is permitted.

2. A motor vehicle having a body including a B-pillar and having a safety belt system including a guide fitting operative to effect vertically adjustable attachment to the body adjacent the B-pillar, the guide assembly comprising:
- A. vertically extending, generally C-shaped hollow component carried with the B-pillar and having a base portion and two upstanding side portions, the side portions being deformed inwardly to define a pair of guide legs;
- B. means defining a toothed surface on the base portion;
- C. an H-shaped slide member received in the hollow component to slidingly engage the guide legs;
- D. eccentric bushing means pivotably mounted with respect to the slide member and carried for vertical movement therewith;
- E. an engagement member located in the plane of the hollow member toothed surface, having a toothed portion engageable with the toothed surface and having a portion operatively connected to the eccentric bushing means to directly effect toothed engagement upon certain pivotal movement of the bushing; and
- F. plate means for guiding the seat belt and including an aperture formed therethrough for receiving the bushing and engageable with portions thereof to limit pivotal movement of the bushing between a position wherein the toothed portions of the engagement member and the hollow member are engaged and a position wherein the toothed portions of the engagement member and the hollow member are separated, the engaged position corresponding to operating positions of the seat belt.

* * * * *